United States Patent [19]

Nakayama et al.

[11] Patent Number: 4,821,447

[45] Date of Patent: Apr. 18, 1989

[54] FISHING ROD AND METHOD OF MANUFACTURING SAME

[75] Inventors: Yoji Nakayama; Akira Yasui, both of Fuchu, Japan

[73] Assignee: Ryobi Ltd., Japan

[21] Appl. No.: 192,361

[22] Filed: May 10, 1988

[30] Foreign Application Priority Data

May 11, 1987 [JP] Japan ................................ 62-115443

[51] Int. Cl.⁴ ..................... A01K 87/06; A01K 87/00; B23P 19/04; B32B 31/04
[52] U.S. Cl. ..................................... 43/18.1; 43/18.5; 43/22; 29/456; 156/188; 156/268
[58] Field of Search ......................... 43/18.1, 18.5, 22; 156/185, 187, 188, 268; 29/456

[56] References Cited

U.S. PATENT DOCUMENTS

| 1,837,623 | 12/1931 | Mansfield | 43/22 |
| 4,214,932 | 7/1984 | Van Auken | 156/188 |
| 4,485,580 | 12/1984 | Ohmura | 43/22 |

FOREIGN PATENT DOCUMENTS

| 1182932 | 8/1986 | Japan | 43/18.1 |
| 61-165170 | 10/1986 | Japan . | |
| 61-165168 | 10/1986 | Japan . | |
| 61-224921 | 10/1986 | Japan . | |
| 2017471 | 10/1979 | United Kingdom | 43/22 |

Primary Examiner—Nicholas P. Godici
Assistant Examiner—William Scott Andes
Attorney, Agent, or Firm—Oliff & Berridge

[57] ABSTRACT

A fishing rod having a portion on which a leg portion of a fishing reel is mounted is composed of three layered structure integrally formed by a thermosetting manner and comprising a prepreg sheet or woven fabric layer prepared by impregnating thermosetting resin into high tension or strength fibers, a glass fiber reinforced sheet layer prepared by impregnating thermosetting resin into glass fibers, and a carbon fiber reinforced sheet layer whose fibers extend in a single orientation prepared by impregnating thermosetting resin into carbon fibers. The three layers constitute a thickened portion on which the reel is mounted. Screw threads are formed throughout the entire axial length of the thickened portion and two nut members are screw-engaged with the screw threads in an axially opposing manner to be axially movable. Two movable hoods for mounting the reel are secured by the two nut members and the movable hoods are mounted on the thickened portion to be axially movable but not rotatable by engaging it with a groove formed axially in the thickened portion. The screw threads and the groove have a depth reaching the glass fiber reinforced sheet layer.

13 Claims, 3 Drawing Sheets

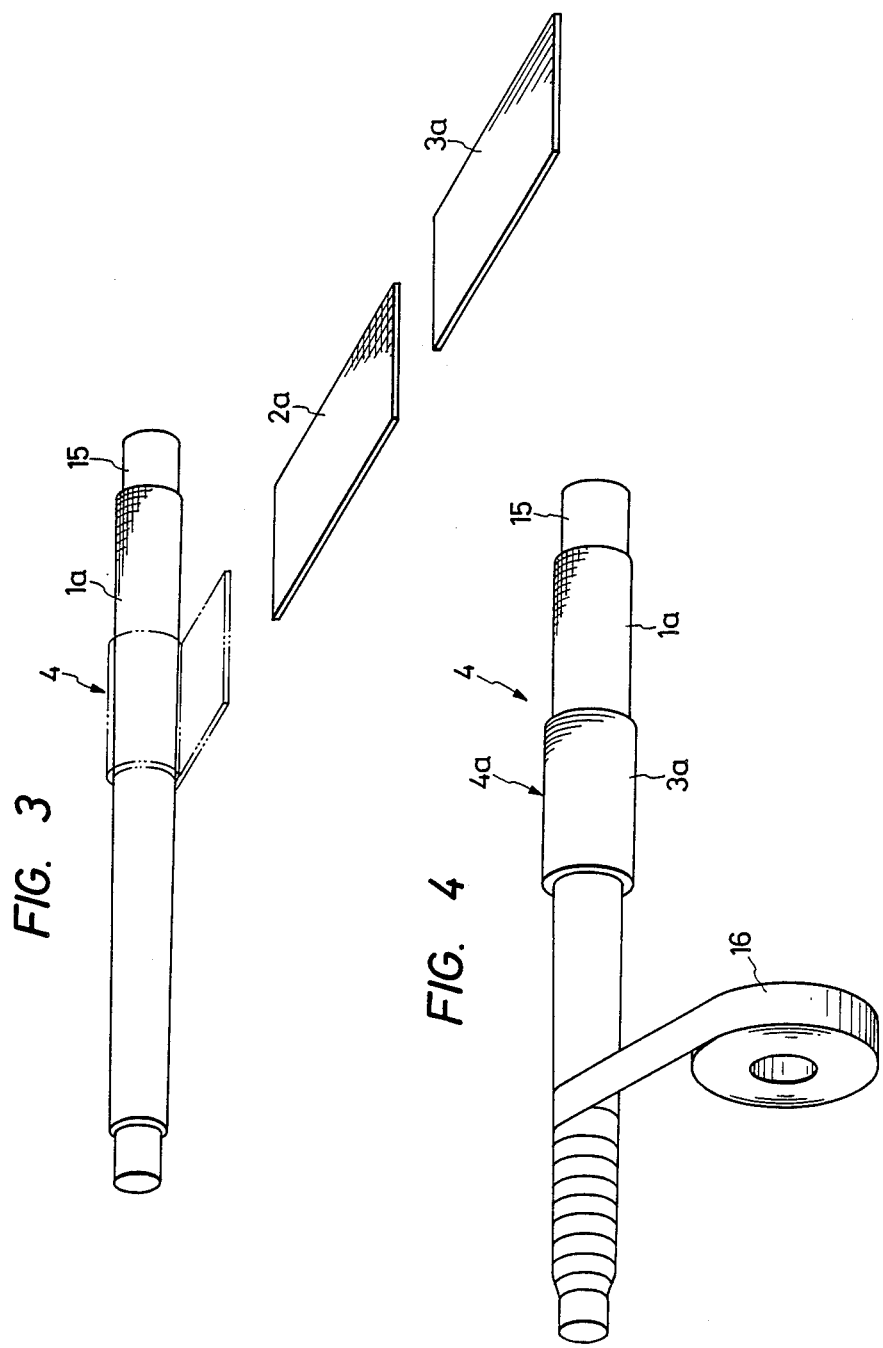

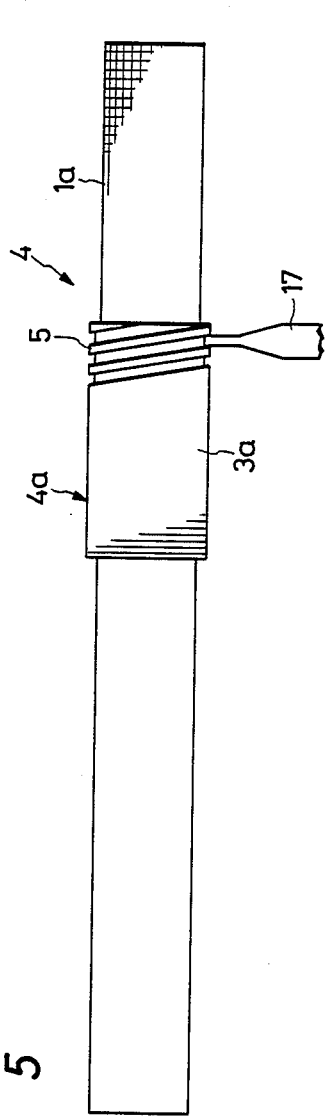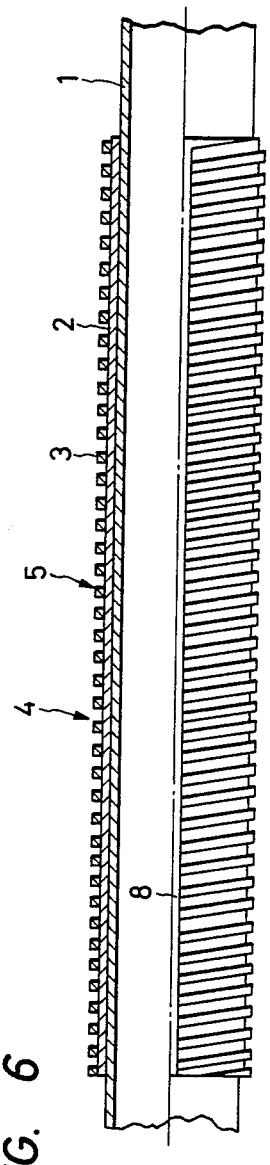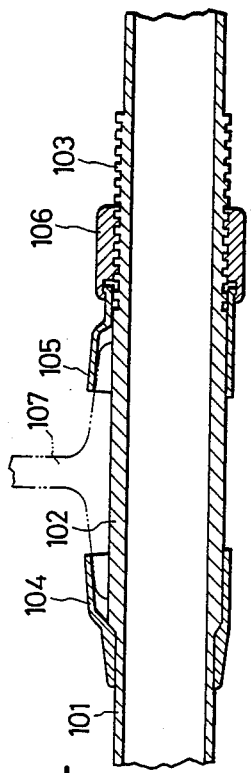
FIG. 5
FIG. 6
FIG. 7 PRIOR ART

FISHING ROD AND METHOD OF MANUFACTURING SAME

BACKGROUND OF THE INVENTION

This invention relates to a fishing rod on which a fishing reel or spool is mounted and also relates to a method of manufacturing the same.

In a known technique, a fishing reel or spool is mounted on a fishing rod in such a manner that a metal plate seat or metal or plastic pipe seat is fitted to a fishing rod as a reel seat and a leg portion of the reel is then mounted on the reel seat at a portion between two movable and stationary hoods mounted on the reel seat.

However, the metal reel seat is cold particularly in the winter season and considerably heavy, thus providing significant problems. On the other hand, the plastic reel seat requires some extent of thickness for the mechanical strength thereof, resulting in the enlargement of the diameter of a grip portion of the fishing rod. Moreover, the existence of some bonding agent between the reel seat and the surface of a material pipe of the fishing rod may blunt a fisher's man feeling to a strike or bite of fish, and the plastic reel seat is apt to peel off from the material pipe of the fishing rod.

In order to obviate these defects or drawbacks, there has been recently provided a fishing rod in which a stationary hood is integrally secured to the rod pipe and screw grooves for the movable hood are formed on the outer surface thereof as disclosed, for example, in Japanese Patent Laid-open Publication No. 224921/1986, and Japanese Utility Model Laid-open Publication Nos. 165170/1986 and 165168/1986.

One example of the conventional fishing rod of the type described above will be described with reference to FIG. 7.

Referring to FIG. 7, a rod 101 is constructed by mounting a prepreg sheet or tube on a core member for the rod 101 in a rolled-up manner, and the rod 101 is provided with a thickened portion 102, on the outer peripheral surface, having a certain axial length on which the leg portion 107 of a fishing reel is mounted. A thread portion 103 is formed continuously to and integrally with the thickened portion 102 on the outer peripheral surface of the rod 101 for engagement with a clamping ring 106 which secures a movable hood 105 of the reel. The threaded portion 3 is formed continuously to one end, near the grip portion of the rod 101, of the thickened portion 102, and a stationary hood 104 is secured to the other end of the thickened portion 102.

However, with the fishing rod of the type described above and shown in FIG. 7, the screw threads are formed directly on the outer surface of the body of the rod, so that the mechanical strength of the rod itself is inevitably weakened. Moreover, since the location of the threaded portion 103 is limited, the fixing position of the reel is limited.

Concerning the location of the reel seat on which the reel is mounted, users have their requirements based on their tastes or liking, or their physiques as well as fishing methods. Accordingly, the determination of the positioning of the reel seat on the rod is a significant problem for makers as well as users; and actually, rod sale shops have been always afflicted with the requirements of the users for changing the location of the reel seat or remodeling the same.

SUMMARY OF THE INVENTION

Accordingly, an object of this invention is to eliminate defects or drawbacks of the conventional fishing rod and to provide a fishing rod having a light weight, and an excellent functionability as well as the mechanical strength and also capable of imparting an improved feeling of strike or bite of fish.

Another object of this invention is to provide a fishing rod on which a reel or spool is mounted in a manner capable of selecting the mounting position of the reel in accordance with the taste of a user.

A further object of this invention is to provide a fishing rod having reinforced laminated structures which are integrally formed.

A still further object of this invention is to provide a method of manufacturing a fishing rod having a light weight, excellent functionability and mechanical strength for the purpose of achieving the objects described above.

These and other objects can be achieved according to this invention by providing a fishing rod having a reel leg mounting portion on which a leg portion of a fishing reel is mounted, said reel leg mounting portion comprising: a prepreg sheet or woven fabric layer formed in such a manner that a prepreg sheet or woven fabric prepared by impregnating thermosetting resin into high tension or strength fibers is rolled up as a cylindrical tube for constituting a base of a fishing rod; a glass fiber reinforced sheet layer formed in such a manner that a glass fiber reinforced sheet prepared by impregnating thermosetting resin into glass fibers is rolled up around a portion of the rolled cylindrical tube of the first mentioned prepreg sheet; a carbon fiber reinforced sheet layer formed in such a manner that a carbon fiber sheet having carbon fibers extending in a single orientation and prepared by impregnating thermosetting resin into carbon fibers is rolled up around the second mentioned glass fiber reinforced sheet layer in a direction perpendicular to an axial length of a rod so as to form a thickened portion together with said two layers; screw threads formed in the carbon fiber sheet layer of the thickened portion throughout an entire axial length thereof; two nut-members each provided with a threaded inner surface which is engageable with the screw threads of the thickened portion to be axially movable; two movable hood members to be mounted on said thickened portion to be engageable with said nut-members respectively in an axially opposing relation to be axially movable but not rotatable with respect to the nut-members, the leg portion of the reel being mounted between said two movable hood members in a movable manner; and a groove formed across said screw threads, said groove engages with a portion of each of two movable hood members for preventing the movable hoods from being rotated.

Further, these and other objects can be achieved according to this invention by providing a method for manufacturing a fishing rod having a portion on which a leg portion of a fishing reel is mounted, comprising the steps of: preparing a rod-like member as a core member for constituting a fishing rod; rolling up a prepreg sheet or woven fabric prepared by impregnating thermosetting resin into high tension or strength fibers around the core member; rolling up a glass fiber reinforced sheet prepared by impregnating thermosetting resin into glass fibers around a portion, on which the leg portion of the reel is to be mounted, of the first mentioned rolled prepreg sheet; rolling up a carbon fiber reinforced sheet having carbon fibers extending in a single orientation and prepared by impregnating thermosetting resin into the carbon fibers around the second mentioned rolled glass fiber reinforced sheet in a direction perpendicular to an axial length of a rod so as to form a thickened portion; tightly bonding the thus rolled prepreg carbon fiber reinforced sheet and glass fiber reinforced sheet; performing a thermosetting treatment to the thus bonded layers to integrally form the thickened portion on which the leg portion of the reel is mounted; forming screw threads in the thickened portion of the carbon fiber reinforced sheet layer throughout the entire axial length thereof; forming a groove across the screw threads for preventing the movable hoods from being rotated in the thickened portion; and mounting two nut members on the thickened portion adapted to position two movable hoods respectively and each provided with a threaded inner surface to be engageable with the screw threads formed in the thickened portion to be axially movable in a state wherein a portion of each nut member is engaged with the groove.

According to the construction of the fishing rod of the character described above, the fishing rod is integrally formed with a three layered structure and provided with a thickened portion in which screw threads are formed throughout the relatively long axial length. The annular nut members for securing movable hoods for fixing the reel leg are axially movably engaged with the screw threads. The use of the fabric sheet whose fibers extend in a single orientation facilitates the formation of the screw threads.

The preferred embodiment of this invention will be further described in detail hereinafter with reference to the accompanying drawings.

BRIEF DESCRIPTION OF THE DRAWINGS

In the accompanying drawings:

FIG. 7 is a longitudinal sectional view of a conventional fishing rod.

DESCRIPTION OF THE PREFERRED EMBODIMENTS

Figure 1:
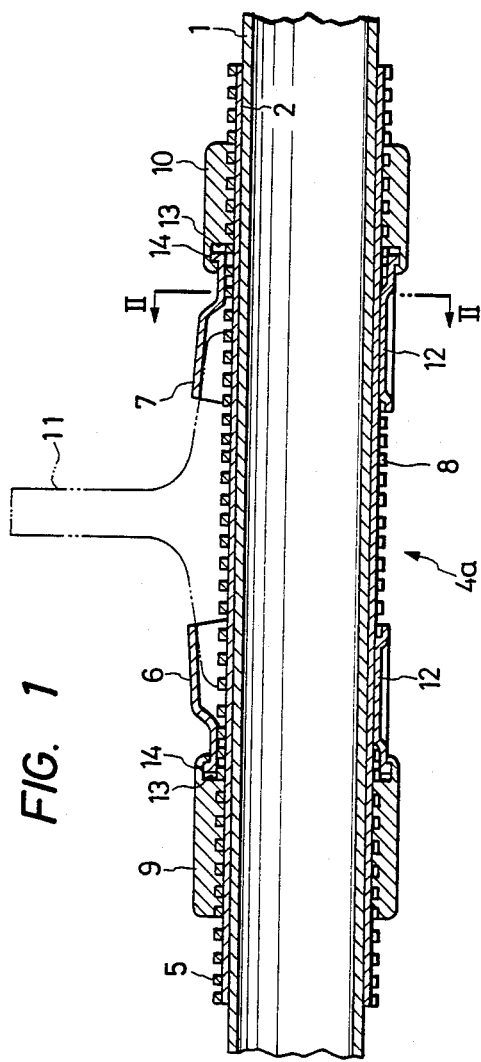
FIG. 1 is a longitudinal sectional view of a portion of a fishing rod according to this invention.
Figure 2:
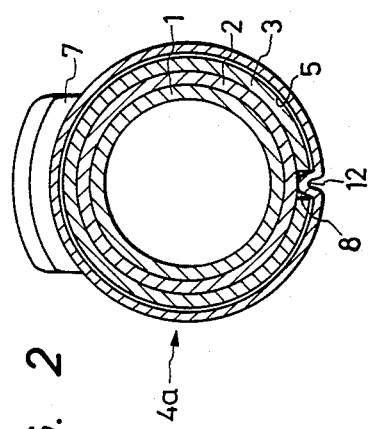
FIG. 2 is a cross sectional view in an enlarged scale of the rod taken along the line II—II in FIG. 1, FIGS. 3 to 6 are sequential views for the explanatory of a manufacturing method of the fishing rod shown in FIG. 1.

Referring to FIGS. 1 and 2, a fishing rod pipe 1 is composed of a prepreg sheet or woven fabric rolled up integrally around a cylindrical member as a rod core, the prepreg sheet or woven fabric being prepared by impregnating thermosetting resin such as epoxy resin or polyester resin into high tension or strength fibers such as carbon, graphite, boron, or polyamide fibers. A prepreg woven fabric prepared by impregnating thermosetting resin such as polyester or epoxy resin into glass fibers is further rolled up around a certain portion of the thus prepared rod pipe 1 on which a leg portion of a fishing reel or spool is mounted, and a sheet whose fibers extend in a single orientation and which is prepared by impregnating thermosetting resin such as epoxy or polyester resin into carbon fibers is further rolled up around the thus prepared rod portion in a direction perpendicular to the axial direction of the rod 1. These two rolled-up layers comprising a glass fiber reinforced layer 2 and a carbon fiber reinforced layer 3 which are laminated and constitute a thickened portion 4a around the outer periphery of the rod 1. Screw threads 5 are formed in the thickened portion 4a throughout the entire axial length thereof for the screw engagement with two ring-shaped nut-like members 9 and 10 for securing two movable hoods 6 and 7, respectively. A groove 8 for preventing the movable hoods 6 and 7 from rotating is formed across the screw threads throughout substantially the entire axial length of the carbon fiber reinforced layer 3. The nut-like members 9 and 10 are mounted on the thickened portion 4a of the rod 1 and provided with threaded inner surfaces which are engageable with the threads 5 so as to be movable forwardly or backwardly in the axial direction on the rod 1. The nut members 9 and 10 hold the movable hoods 6 and 7 in such a manner that the hoods 6 and 7 are opposed to each other. The leg portion 11 of the reel can be detachably mounted between these movable hoods 6 and 7.

As described before, in the preferred embodiment, it is desired to form the rotation preventing groove 8 with a depth corresponding to the thickness of the carbon fiber reinforced layer 3, that is, a depth through which the groove 8 reaches the outer surface of the glass fiber-reinforced layer 2 for suitably maintaining the mechanical strength of the rod 1 and for preventing the glass fiber reinforced layer 2 from accidental damage. Each of the bottom land portions of the screw threads 5 also has a depth corresponding to that of the groove 8. Moreover, it is desired to locate the groove 8 for preventing the rotation of the movable hoods 6 and 7 at a portion opposed to the location of the reel leg portion 11 on the thickened portion 4a of the rod as shown in FIG. 1. The respective movable hoods 6 and 7 have projections 12 projecting inwardly and extending along the axial length thereof, and the projections 12 are fitted into the groove 8 so as to allow the movable hoods 6 and 7 to be axially slidable but prohibit the rotation thereof.

The nuts 9 and 10 have one end opposed to each other on the rod and annular grooves 13 are circumferentially formed in the inner surfaces of these opposing end portions of the nuts 9 and 10. Annular projections 14 are formed at one end of the respective movable hoods 6 and 7 so as to be engaged with the corresponding annular grooves 13, respectively, thereby allowing the nuts 9 and 10 to be rotated in the circumferential direction, but prohibiting the axial movement thereof separately from the respective nuts 9 and 10.

The movable hoods 6 and 7 and the nut members 9 and 10 can be manufactured with an optional material such as metal or synthetic resin.

The fishing rod of the construction described hereinabove will be prepared and manufactured in accordance with a method or process described hereinafter with reference to FIGS. 3 to 6.

A prepreg sheet 1a or woven fabric prepared by impregnating thermosetting resin such as epoxy or polyester resin into high tension or strength fibers such as carbon, graphite, boron or polyamide fabric is first rolled up around a core member 15 for constituting a fishing rod. A prepreg glass fiber reinforced sheet 2a prepared by impregnating thermosetting resin such as polyester or epoxy resin into glass fibers is rolled up around a portion 4 of the outer peripheral surface of the rolled prepreg sheet 1a on which a leg portion of a fishing reel is mounted. A sheet 3a whose fibers extend in a single orientation and which is prepared by impregnating thermosetting resin such as epoxy or polyester resin into carbon fibers is further rolled up around the reel leg mounting portion 4 of the rolled glass fiber reinforced sheet 2a so that the carbon fibers in the sheet 3a extend in a direction perpendicular to the axial length of the core 15, thus forming a thickened portion 4a, having a thickness more than that of the other portions of the rod, on which a reel mounting portion 4 is formed.

As shown in FIG. 4, the prepreg sheet 1a for constituting a fishing rod 1, the prepreg sheet 2a of the glass fiber and the prepreg sheet 3a of the carbon fiber are rolled up around the core member 15, and the outer surfaces of these sheets 1a, 2a and 3a are tightly bound by means of a tape 16 or thermo-shrinkable tube, not shown. Under the condition, the sheets are subjected to the thermosetting treatment by known means for integrally forming the rod 1 and the reel leg mounting portion 4. The core member 15 is thereafter drawn out from the thus formed and thermally set prepreg rod 1, and the tape 16 is then peeled off.

Screw threads 5 are formed in the thickened portion 4a of the reel leg mounting portion 4 throughout the entire outer peripheral surface in the axial direction thereof by means of a bit 17, for example, so as to have a depth of each thread reaching the outer surface of the glass fiber reinforced sheet 2a. The glass fiber reinforced sheet 2a functions not only ensure the mechanical strength of the rod 1 but also inform an operator operating the bit 17 of depth of cut because the surface of the glass fiber reinforced sheet 2a becomes white when the bit 17 cuts its surface. The groove 8 for preventing the movable hoods 6 and 7 from being unwillingly rotated is formed by means of a milling cutter, for example throughout the considerable axial length of the thickened portion 4a at a portion opposing to the mounting portion of the reel leg on the rod 1, thus preventing the rotation of the movable hoods 6 and 7 but being axially movable. The nut members 9 and 10 provided with inner threaded portions are mounted to be engageable with the screw threads 5 movably in the axial direction thereof and are disposed opposite to each other on the thickened portion 4a of the rod 1. The nut members 9 and 10 have annular circumferential grooves with which the movable hoods 6 and 7 are rotatably engaged, and the leg portion 11 of the reel is fitted between the respective movable hoods 6 and 7.

According to this invention as described hereinabove, since the fishing rod is constructed in a three layered structure which is integrally formed, the mechanical strength can be ensured. In addition, the screw threads are formed in the thickened portion of the three layered structure throughout substantially the entire axial length, so that the movable hoods for securing the leg portion of the reel can be movably mounted thereon by means of annular nut members provided with threaded inner surface engageable with the screw threads of the thickened portion. Thus, the reel can be secured to the rod at an optional portion desired by a user in accordance with his taste, liking and fishing method. Furthermore, the integral three layered structure without using any bonding agent can provide a direct feeling of strike or bite of fish to the user. The integral three layered structure also provides an advantage in that the formation of the screw threads can be performed so as to have a uniform depth without cutting excessively, thus keeping the mechanical strength.

The use of a fabric sheet whose fibers extend in a single orientation for the thickened portion facilitates the uniform formation of the screw threads.

Accordingly, a fishing rod having a light weight, excellent functions and mechanical strength can be manufactured by the method of this invention.

It should be understood that this invention was described hereinbefore with reference to the preferred embodiment, but various changes and modifications may be made according to this invention as far as departing from the sprit and scope of the appended claims.

What is claimed is:

1. A fishing rod having a reel leg mounting portion on which a leg portion of a fishing reel is mounted, said reel leg mounting portion comprising:

a prepreg sheet or woven fabric layer formed in such a manner that a prepreg sheet or woven fabric prepared by impregnating thermosetting resin into high tension or strength fibers is rolled up as a cylindrical tube for constituting a base of a fishing rod;

a glass fiber reinforced sheet layer formed in such a manner that a glass fiber reinforced sheet prepared by impregnating thermosetting resin into glass fibers is rolled up around a portion of the rolled cylindrical tube of the first mentioned prepreg sheet;

a carbon fiber reinforced sheet layer formed in such a manner that a carbon fiber reinforced sheet having carbon fibers extending in a single orientation and prepared by impregnating thermosetting resin into carbon fibers is rolled up around the second mentioned glass fiber reinforced sheet so that the carbon fibers in the carbon fiber reinforced sheet extend in a direction perpendicular to an axial length of a rod so as to form a thickened portion together with said two layers;

screw threads formed on the carbon fiber reinforced sheet layer of the thickened portion throughout an entire axial length thereof;

two nut-members each provided with a threaded inner surface which is engageable with the screw threads of the thickened portion to be axially movable;

two movable hood members to be mounted on said thickened portion to be engageable with said nut members respectively in an axially opposing relation to be axially movable but not rotatable with respect to the nut-members, the leg portion of the reel being mounted between said two movable hood members in a movable manner; and a groove formed across said screw threads, said groove engaging with a portion of each of two movable hood members for preventing the movable hood members from being rotated.

2. The fishing rod according to claim 1 wherein each of the screw threads of the thickened portion has a depth reaching an outer surface of the glass fiber reinforced sheet layer.

3. The fishing rod according to claim 1 wherein said groove is formed in the thickened portion throughout substantially the entire axial length thereof, said groove having a depth reaching an outer surface of the glass fiber reinforced sheet layer.

4. The fishing rod according to claim 3 wherein said groove is located at a part of the thickened portion on which the leg portion of the reel is mounted.

5. The fishing rod according to claim 3 wherein each of said movable hood members has an inwardly projecting portion which is fitted into said groove.

6. The fishing rod according to claim 1 wherein said high tension or strength fibers for the prepreg sheet or woven fabric layer for the base of the fishing rod are made of carbon, graphite, boron or polyamide and said thermosetting resin is made of epoxy or polyester.

7. The fishing rod according to claim 1 wherein each of said nut members has an inner end provided with an inner annular groove and each of said movable hood members has an outer end provided with an annular projection to be engaged with said annular groove of each nut member so as to be axially movable but not rotatable with respect to the rod.

8. A method for manufacturing a fishing rod having a reel leg mounting portion on which a leg portion of a fishing reel is mounted, comprising the steps of:

preparing a rod-like member as a core member for constituting a fishing rod;

rolling up a prepreg sheet or woven fabric prepared by impregnating thermosetting resin into high tension or strength fibers around the core member;

rolling up a prepreg glass fiber reinforced sheet prepared by impregnating thermosetting resin into glass fibers around a portion, on which the leg portion of the reel is to be mounted, of the first mentioned rolled prepreg sheet;

rolling up a carbon fiber reinforced sheet having carbon fibers extending in a single orientation and prepared by impregnating thermosetting resin into the carbon fibers around the second mentioned rolled glass fiber reinforced sheet so that the carbon fibers in the carbon fiber reinforced sheet extend in a direction perpendicular to an axial length of a rod so as to form a thickened portion;

tightly bonding the thus rolled prepreg sheet, carbon fiber reinforced sheet and glass fiber reinforced sheet;

performing a thermosetting treatment to the thus bonded sheets to integrally form the thickened portion on which the leg portion of the reel is mounted;

forming screw threads in the thickened portion of the carbon fiber reinforced sheet throughout the entire axial length thereof;

forming a groove across the screw threads for preventing two movable hood members from being rotated in the thickened portion; and mounting two nut members on the thickened portion adapted to position two movable hood members respectively and each provided with a threaded inner surface to be engageable with the screw threads formed in the thickened portion to be axially movable in a state wherein a portion of each hood member is engaged with the groove.

9. The method according to claim 8 wherein each of said screw threads formed in the thickened portion has a depth reaching an outer surface of the glass fiber reinforced sheet.

10. The method according to claim 8 wherein said groove is formed throughout substantially the entire axial length of the thicked portion so as to have a depth reaching the outer surface of the glass fiber reinforced sheet.

11. The method according to claim 10 wherein said groove is formed at a part of the thickened portion on which the leg portion of the reel is mounted.

12. The method according to claim 8 wherein said prepreg sheet, glass fiber reinforced sheet and carbon fiber reinforced sheet are tightly bonded by means of a tape which is peeled off after the thermosetting treatment.

13. The method according to claim 8 wherein said high tension or strength fibers for the prepreg sheet or woven fabric are made of carbon, graphite, boron or polyamide and said thermosetting resin is made of epoxy or polyester.

* * * * *